(No Model.)
G. D. BURTON.
ELECTRIC METAL HEATING PROCESS.
No. 537,004. Patented Apr. 9, 1895.
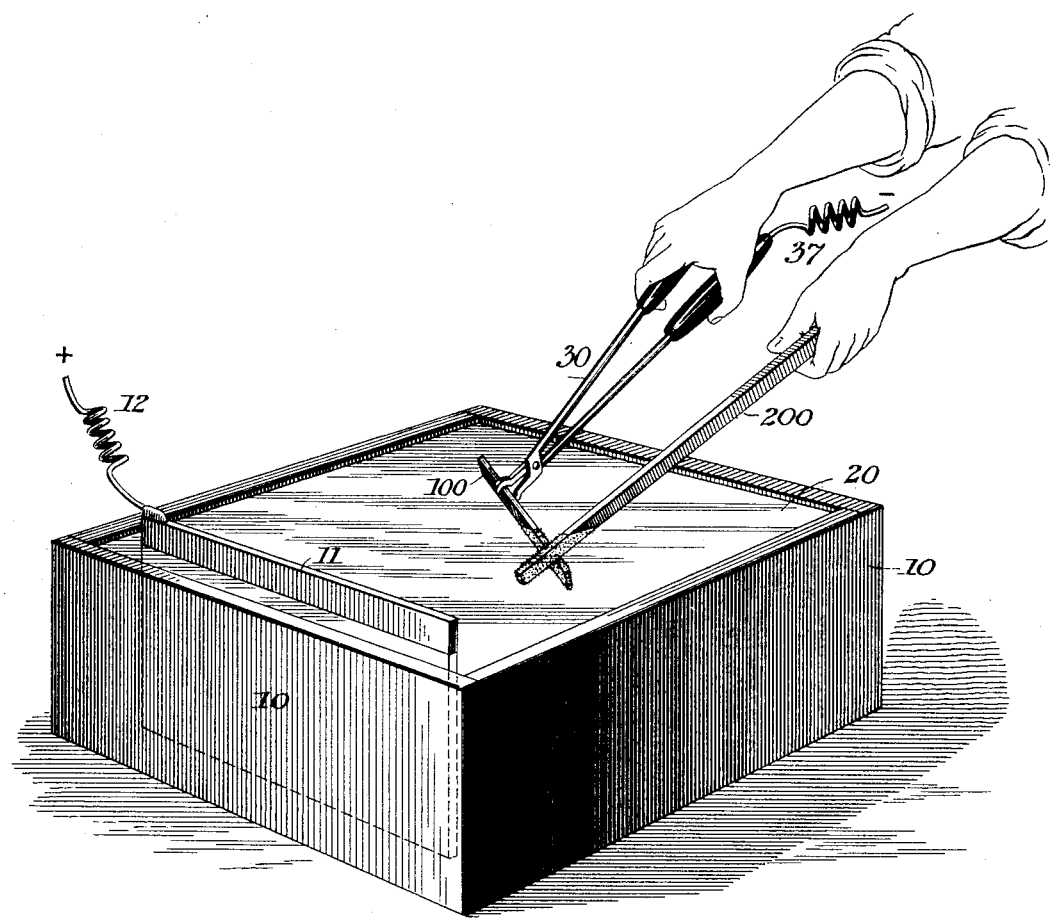
Witnesses
Raymond P. Barnes.
Ian G. Cameron,
Inventor
Geo. D. Burton
By F. L. Somes,
Attorney

UNITED STATES PATENT OFFICE.

GEORGE D. BURTON, OF BOSTON, MASSACHUSETTS.

ELECTRIC METAL-HEATING PROCESS.

SPECIFICATION forming part of Letters Patent No. 537,004, dated April 9, 1895.

Application filed December 11, 1893. Serial No. 493,432. (No specimens.)

*To all whom it may concern:*

Be it known that I, GEORGE DEXTER BURTON, a citizen of the United States of America, residing at Boston, in the county of Suffolk, in the State of Massachusetts, have invented certain new and useful Improvements in Electric Metal-Heating Processes, of which the following is a specification.

This invention relates to the art of heating metal for forging or other metal working operations by immersing the metal or that portion thereof to be heated in a bath and passing therethrough an electric current of such a character as to cause the formation of an incandescent gas envelope or electric arc at and below the surface of the solution and around the metal to be heated, whereby the heating thereof is quickly effected.

The object of the invention is to provide a bath for this purpose which will effect the heating of the metal in a rapid and economical manner without injury to the metal or danger to those practicing the process.

The drawing represents a perspective view of an apparatus used in carrying out this process.

A receptacle 10 composed in whole or in part of wood, earthenware or other insulating material, and constructed in the form of a tank or other suitable vessel, contains a bath 20 in which the metal to be heated is inserted and partially or wholly immersed. A plate 11, preferably of lead, is disposed in the bath and serves as an anode, being connected by means of a conductor 12 with the positive pole of a direct current generator or other suitable source of current. The receptacle 10 may be provided with a lining of lead if desired, or made of lead and made to act as one pole of the current.

The bath 20 consists of a solution composed of water, carbonate of soda, and powdered borax. I have used this solution in the proportions of eight quarts of water to twelve pounds of carbonate of soda and one pound of powdered borax. I do not confine myself to these proportions as they may be varied without departing from the scope of this invention. Alum may be used instead of the borax and as an equivalent therefor and it is to be understood that it is covered by the claims hereinafter contained.

In carrying out this process, a bar of metal, as 110, to be heated is grasped by a pair of tongs or other holder, as 30, provided with insulated handles and carried in one hand, one of said handles being connected by a conductor as 31, with the negative pole of the electric source, and the bar or the portion thereof to be heated is submerged in the bath and held near the surface thereof. As soon as the metal touches the bath, the circuit is closed through the anode 11 and bath 20. An envelope of hydrogen or other gas is instantly formed around the submerged portion of the metal, which envelope is incandescent and constitutes a voltaic arc surrounding the metal on all portions below the surface thereof and separating it from the solution. The temperature of the bar is raised in a few seconds or minutes to the desired forging or welding point. When the piece has attained the proper heat, which is observed by the workman, it is subjected to the desired forging or welding operation.

The voltage of the current employed may vary from about one hundred and forty-five volts upward and the ampèrage from forty ampères upward, according to the size of the piece to be heated. With the voltage and ampèrage specified above I have heated pieces of steel and of iron from one fourth of an inch to three fourths of an inch in cross section for a length of three inches to a red or white heat or to the fusing point in about a minute or a minute and a quarter. Bars of different sizes may be heated in the same bath up to the capacity of the circuit for conveying current. The passage of the current into the solution seems to transform it from a high tension and low volume to a current of large volume and low tension.

Another bar, as 200, may be held in contact with the bar 100 and receive current therefrom, and an incandescent gas envelope will be formed around those portions thereof which are submerged below the surface of the solution. Such bars may be welded together in the bath, if desired, when the proper temperature for such welding is obtained. This welding may be effected by simply bringing them in contact with each other.

I have found by experience that the bath herein described can be efficiently used for a long time.

I claim as my invention—

1. The art of heating metal, which consists in submerging or partially submerging it in a bath consisting of an aqueous solution of carbonate of soda and borax, and then passing an electric current through said metal and solution, forming an incandescent gas envelope or voltaic arc around the immersed metal, substantially as set forth.

2. The art of working metal, which consists in immersing or partially immersing a metal to be worked in a bath consisting of an aqueous solution of carbonate of soda and borax, and subjecting said metal while so immersed to the action of an electric current until it is raised to the desired working heat, and then subjecting the heated and softened metal to a metal working operation.

GEO. D. BURTON.

Witnesses:
CHAS. F. ADAMS,
E. F. PHILIPSON.